(12) United States Patent
Ichikawa et al.

(10) Patent No.: US 9,759,315 B2
(45) Date of Patent: Sep. 12, 2017

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Shinya Ichikawa, Anjo (JP); Masamichi Yamaguchi, Anjo (JP); Yoshimitsu Hyodo, Nishio (JP); Koji Makino, Okazaki (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/100,794

(22) PCT Filed: Dec. 24, 2014

(86) PCT No.: PCT/JP2014/084123
§ 371 (c)(1),
(2) Date: Jun. 1, 2016

(87) PCT Pub. No.: WO2015/098950
PCT Pub. Date: Jul. 2, 2015

(65) Prior Publication Data
US 2016/0305543 A1    Oct. 20, 2016

(30) Foreign Application Priority Data
Dec. 26, 2013  (JP) .................................. 2013-270425

(51) Int. Cl.
*F16H 61/12*   (2010.01)
*F16H 3/66*    (2006.01)
(Continued)

(52) U.S. Cl.
CPC ............. *F16H 61/12* (2013.01); *F16H 3/666* (2013.01); *F16H 61/686* (2013.01);
(Continued)

(58) Field of Classification Search
None
See application file for complete search history.

(56) References Cited

U.S. PATENT DOCUMENTS 6,164,734 A * 12/2000 Otomo .................... B60T 7/042
188/1.11 E
2005/0266959 A1   12/2005 Nozaki et al.
(Continued)

FOREIGN PATENT DOCUMENTS

JP    H07-217731 A    8/1995
JP    2005-344741 A   12/2005
(Continued)

OTHER PUBLICATIONS

Mar. 24, 2015 International Search Report issued in International Patent Application No. PCT/JP2014/084123.

*Primary Examiner* — Justin Holmes
(74) *Attorney, Agent, or Firm* — Oliff PLC (57) ABSTRACT

A hydraulic control device that includes a normally closed first solenoid valve, a first check valve, a failsafe valve, and a second check valve, wherein the first movable member of the first check valve is biased to cut off the communication between the first input port and the first drain port in case of the failure in which no current is applied to the first solenoid valve.

8 Claims, 8 Drawing Sheets

(51) Int. Cl.
*F16H 61/686* (2006.01)
*F16H 61/02* (2006.01)

(52) U.S. Cl.
CPC ............ *F16H 2061/0209* (2013.01); *F16H 2061/1252* (2013.01); *F16H 2061/1264* (2013.01); *F16H 2200/0069* (2013.01); *F16H 2200/201* (2013.01); *F16H 2200/2046* (2013.01)

(56) References Cited

U.S. PATENT DOCUMENTS

2009/0143180 A1    6/2009  Shimizu et al.
2010/0050593 A1*  3/2010  Futa .................. F02C 7/228
                                                  60/39.094

FOREIGN PATENT DOCUMENTS

| JP | 2009-085351 A | 4/2009 |
| JP | 2009-150532 A | 7/2009 |
| JP | 2010-236668 A | 10/2010 |

* cited by examiner

|  | C1 | C2 | C3 | C4 | B1 | B2 |
|---|---|---|---|---|---|---|
| Rev |  | ○ | ○ |  |  | ○ |
| P, N |  | ○ |  |  |  | ○ |
| 1st | ○ | ○ |  |  |  | ○ |
| 2nd | ○ |  |  |  | ○ | ○ |
| 3rd |  | ○ |  |  | ○ | ○ |
| 4th |  |  |  | ○ | ○ | ○ |
| 5th |  | ○ |  | ○ | ○ |  |
| 6th | ○ |  |  | ○ | ○ |  |
| 7th | ○ |  | ○ | ○ |  |  |
| 8th |  |  | ○ | ○ | ○ |  |
| 9th | ○ |  | ○ |  | ○ |  |
| 10th |  | ○ | ○ |  | ○ |  |

FIG.2B

|  | C1 | C2 | C3 | C4 | B1 | B2 |
|---|---|---|---|---|---|---|
| 7th |  | ○ | ○ | ○ |  |  |
| 7th | ○ | ○ |  | ○ |  |  |
| 7th | ○ | ○ | ○ |  |  |  |

FIG.8B

HYDRAULIC CONTROL DEVICE FOR AUTOMATIC TRANSMISSION

BACKGROUND

The present disclosure relates to hydraulic control devices for automatic transmissions that include a plurality of engagement elements and that are mounted on, e.g., vehicles, and more particularly to hydraulic control devices for automatic transmissions which have a limp home function for off-failure of linear solenoid valves that can supply an oil pressure to hydraulic servos of a plurality of engagement elements.

Conventionally, stepped automatic transmissions that are mounted on, e.g., vehicles can implement multi-speed shifting by controlling the engagement states of a plurality of engagement elements (clutches and brakes) by a hydraulic control device so as to form a transmission path in a speed change mechanism at each shift speed. Among such hydraulic control devices, those hydraulic control devices are widely used which include linear solenoid valves that can supply an oil pressure to hydraulic servos for engaging and disengaging the engagement elements, and which have a limp home function for all-off failure, or failure in which all of solenoid valves such as the plurality of linear solenoid valves are turned off (a function to establish a shift speed even in case of all-off failure such that the vehicle can be driven). Hydraulic control devices for automatic transmissions are under development which, as such a limp home function, reversely inputs a limp home pressure to drain ports of linear solenoid valves, so that those engagement elements corresponding to the shift speed in a limp home mode can be engaged (see Japanese Patent Application Publication No. 2005-344741).

Such a hydraulic control device includes a failsafe valve that outputs a range pressure as the limp home pressure in case of all-off failure of the solenoid valves. In this hydraulic control device, when the solenoid valves are operating normally without causing all-off failure, oil discharged from the drain port of the linear solenoid valve flows through the failsafe valve and is then discharged through a drain check valve.

SUMMARY

In the hydraulic control device for the automatic transmission according to Japanese Patent Application Publication No. 2005-344741, when the solenoid valves are operating normally, oil discharged from the drain port of the linear solenoid valve is applied to the drain check valve through the failsafe valve. Accordingly, an oil passage from the drain port to the drain check valve is longer than in the case where oil flows from the drain port of the linear solenoid valve directly into the drain check valve without flowing through the failsafe valve. This increases flow resistance and thus tends to delay oil discharge from the linear solenoid valve and the hydraulic servo of the engagement element, which may reduce controllability of the engagement elements. Moreover, the linear solenoid valve and the location from which oil is discharged are located away from each other with the failsafe valve interposed therebetween, which may increase the overall size of the hydraulic control device.

An exemplary aspect of the present disclosure provides a hydraulic control device for an automatic transmission which can reversely input an oil pressure to a drain port of a linear solenoid valve to supply the oil pressure to a hydraulic servo in case of all-off failure of solenoid valves, and which can reduce the length of an oil passage from the drain port to a drain check valve to restrain reduction in controllability of engagement elements.

According to an exemplary aspect of the present disclosure, a hydraulic control device for an automatic transmission that can establish a plurality of shift speeds by selectively engaging a plurality of engagement elements, the hydraulic control device including: a normally closed first solenoid valve that can supply an oil pressure to a hydraulic servo of an engagement element of the plurality of engagement elements; a first check valve having a first input port that communicates with a drain port of the first solenoid valve, a first drain port, a first movable member that can switchably allow the first input port to communicate with the first drain port and cut off the communication between the first input port and the first drain port, and a first biaser that biases the first movable member such that the communication between the first input port and the first drain port is cut off; a failsafe valve having a failure pressure output port that is switched to a failure position to output a predetermined oil pressure in case of failure in which no current is applied to the first solenoid valve; and a second check valve having a second input port that communicates with the failure pressure output port, an output port that communicates with the drain port of the first solenoid valve and the first input port of the first check valve, a second movable member that can switchably allow the second input port to communicate with the output port and cut off the communication between the second input port and the output port, and a second biaser that biases the second movable member such that the communication between the second input port and the output port is cut off and for allowing the second input port to communicate with the output port at an oil pressure lower than the predetermined oil pressure, wherein the first movable member of the first check valve is biased to cut off the communication between the first input port and the first drain port in case of the failure in which no current is applied to the first solenoid valve.

Accordingly, in case of all-off failure of the solenoid valves, the failsafe valve is switched to the failure position, the first movable member of the first check valve is biased so as to cut off the communication between the first input port and the first drain port, and the first input port and the first drain port are locked in the cut-off state. At the same time, the predetermined oil pressure that is output from the failure pressure output port is applied to the second check valve so as to allow the second input port to communicate with the output port. The second biaser biases the second movable member so as to cut off the communication between the second input port and the output port. However, since the second biaser allows the second input port to communicate with the output port at an oil pressure lower than the predetermined oil pressure, the second input port communicates with the output port when the predetermined oil pressure is input.

The oil pressure having passed through the second check valve reaches the side of the first check valve on which the first input port is opened. However, due to delay in both supply of, and increase in, the oil pressure which is caused when the second check valve is switched to the open side, the first input port and the first drain port therefore have already been locked in the cut-off state when the oil pressure reaches the first check valve. Moreover, the oil pressure is reduced when opening the second check valve. Accordingly, the oil pressure having reached the first input port through the second check valve is lower than a lock pressure and a lock force of the first biaser. Accordingly, the oil pressure output from the second check valve is reversely input to the drain port of the first solenoid valve without opening the first check valve, so that the oil pressure can be supplied to the hydraulic servo to control the hydraulic servo.

According to this hydraulic control device for the automatic transmission, the first solenoid valve communicates directly with the first check valve (drain check valve). Accordingly, an oil passage that allows the first solenoid valve to communicate with the first check valve can be made shorter than in the case where the first solenoid valve communicates with the first check valve (drain check valve) via the failsafe valve. This can restrain reduction in controllability due to an increase in flow resistance and can restrain an increase in size of the hydraulic control device.

According to the hydraulic control device for the automatic transmission, the first movable member is biased so as to cut off the communication between the first input port and the first drain port in case of failure in which no current is applied to the first solenoid valve. That is, the biaser for the first movable member is not particularly limited. For example, an oil pressure such as a range pressure may be supplied as a lock pressure, or a mechanical external force of a member, a mechanism, etc. other than an oil pressure may be applied to bias the first movable member. This can improve design flexibility.

BRIEF DESCRIPTION OF THE DRAWINGS

FIGS. 2A and 2B show engagement tables of the automatic transmission according to the embodiment of the present disclosure, where

FIGS. 8A and 8B show enlarged views of each part of the hydraulic control device according to the embodiment of the present disclosure, where

DETAILED DESCRIPTION OF EMBODIMENTS

An embodiment of the present disclosure will be described below with reference to FIGS. 1 to 8.

First, the general configuration of an automatic transmission 1 to which the present disclosure can be applied will be described with reference to FIGS. 1 to 3. The automatic transmission 1 of the present embodiment is connected to a crankshaft of an engine (internal combustion engine) or a rotor of an electric motor, not shown, as a driving source mounted longitudinally in the front part of a rear wheel drive vehicle, and can transmit power (torque) from the engine etc. to right and left rear wheels (driving wheels), not shown. The automatic transmission 1 includes a starting device (hydraulic transmission device) 2, an oil pump 3, a speed change mechanism 4 that shifts the power transmitted from the engine etc. to an input shaft (input member) 40 to transmit the shifted power to an output shaft (output member) 41, and a transmission case 5 accommodating these components.

The starting device 2 includes a torque converter 20, a lockup clutch 21 that can connect and disconnect a front cover coupled to the crankshaft of the engine etc. to and from the input shaft 40 of the speed change mechanism 4, and a damper mechanism 22 that is disposed between the front cover and the input shaft 40 of the speed change mechanism 4 to dampen vibration. The torque converter 20 includes an input-side pump impeller 23 that is coupled to the front cover, an output-side turbine runner 24 that is coupled to the input shaft 40 of the speed change mechanism 4, a stator 25 that is placed inside the pump impeller 23 and the turbine runner 24 to adjust the flow of hydraulic oil from the turbine runner 24 to the pump impeller 23, and a one-way clutch 26 that is supported by a stator shaft, not shown, and that allows the stator 25 to rotate only in one direction. The torque converter 20 may be a fluid coupling that does not have the stator 25.

The oil pump 3 is configured as a gear pump having a pump assembly including a pump body and a pump cover, an external gear (inner rotor) coupled to the pump impeller 23 of the torque converter 20 via a chain or a gear train, an internal gear (outer rotor) meshing with the external gear, etc. The oil pump 3 is driven by the power from the engine etc. to suck hydraulic oil stored in an oil pan, not shown, to pressure-feed the sucked hydraulic oil to a hydraulic control device 50 described later.

The speed change mechanism 4 is configured as a ten-speed transmission, and includes: the input shaft 40; the output shaft 41 that is coupled to the right and left rear wheels via a differential gear and a drive shaft, both not shown; a single-pinion type first planetary gear 42 and a single-pinion type second planetary gear 43 which are arranged side by side in the axial direction of the input shaft 40 and the output shaft 41; and a planetary gear set 44 as a Ravigneaux type planetary gear mechanism formed by combination of a double-pinion type planetary gear and a single-pinion type planetary gear. The speed change mechanism 4 further includes a first clutch C1, a second clutch C2, a third clutch C3, a fourth clutch C4, a first brake B1, and a second brake B2 as six engagement elements that change a power transmission path from the input shaft 40 to the output shaft 41.

Figure 1:
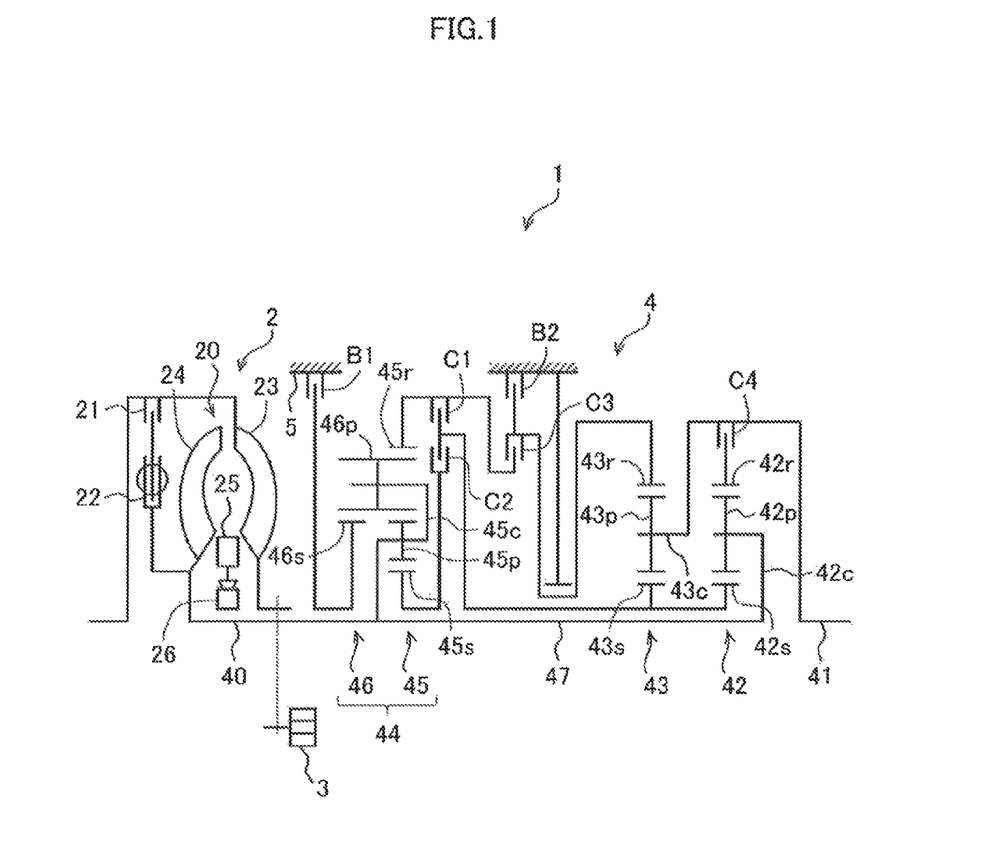
FIG. 1 is a skeleton diagram of an automatic transmission according to an embodiment of the present disclosure.

In the present embodiment, the first and second planetary gears 42, 43 and the planetary gear set 44 are placed in the transmission case 5 so as to be arranged in order of the planetary gear set 44, the second planetary gear 43, and the first planetary gear 42 from the starting device 2 side, namely from the engine side (the left side in FIG. 1). The planetary gear set 44 is thus placed on the front side of the vehicle so as to be located near the starting device 2. The first planetary gear 42 is placed on the rear side of the vehicle so as to be located near the output shaft 41. The second planetary gear 43 is placed between the planetary gear set 44 and the first planetary gear 42.

The first planetary gear 42 includes a first sun gear 42s as an external gear, a first ring gear 42r as an internal gear placed concentrically with the first sun gear 42s, a plurality of first pinion gears 42p each meshing with the first sun gear 42s and the first ring gear 42r, and a first carrier 42c holding the plurality of first pinion gears 42p such that the plurality of first pinion gears 42p can rotate (turn) and revolve. In the present embodiment, the gear ratio λ1 of the first planetary gear 42 (the number of teeth of the first sun gear 42s/the number of teeth of the first ring gear 42r) is set to, e.g., λ1=0.277.

The first carrier 42c of the first planetary gear 42 is constantly coupled (fixed) to an intermediate shaft 47 of the speed change mechanism 4 which is coupled to the input shaft 40. Accordingly, when the power is being transmitted from the engine etc. to the input shaft 40, the power from the engine etc. is constantly transmitted to the first carrier 42c via the input shaft 40 and the intermediate shaft 47. The first carrier 42c functions as an input element of the first planetary gear 42 when the fourth clutch C4 is in an engaged state. The first carrier 42c idles when the fourth clutch C4 is in a disengaged state. The first ring gear 42r functions as an output element of the first planetary gear 42 when the fourth clutch C4 is in an engaged state.

The second planetary gear 43 has a second sun gear 43s as an external gear, a second ring gear 43r as an internal gear placed concentrically with the second sun gear 43s, a plurality of second pinion gears 43p each meshing with the second sun gear 43s and the second ring gear 43r, and a second carrier (planetary carrier) 43c holding the plurality of second pinion gears 43p such that the plurality of second pinion gears 43p can rotate (turn) and revolve. In the present embodiment, the gear ratio λ2 of the second planetary gear 43 (the number of teeth of the second sun gear 43s/the number of teeth of the second ring gear 43r) is set to, e.g., λ2=0.244.

The second sun gear 43s of the second planetary gear 43 is integrated to (constantly coupled to) the first sun gear 42s of the first planetary gear 42 and always rotates or stops together with (and coaxially with) the first sun gear 42s. However, the first sun gear 42s and the second sun gear 43s may be formed as separate members and may be constantly coupled together via a coupling member, not shown. The second carrier 43c of the second planetary gear 43 is constantly coupled to the output shaft 41 and always rotates or stops together with (and coaxially with) the output shaft 41. The second carrier 43c thus functions as an output element of the second planetary gear 43. Moreover, the second ring gear 43r of the second planetary gear 43 functions as a fixable element of the second planetary gear 43.

The planetary gear set 44 is a compound planetary gear mechanism formed by combination of a third planetary gear 45 as a double-pinion type planetary gear and a fourth planetary gear 46 as a single-pinion type planetary gear. The planetary gears are placed in the transmission case 5 so as to be arranged in order of the fourth planetary gear 46, the third planetary gear 45, the second planetary gear 43, and the first planetary gear 42 from the engine side.

The planetary gear set 44 includes a third sun gear 45s and a fourth sun gear 46s as external gears, a third ring gear 45r as an internal gear placed concentrically with the third and fourth sun gears 45s, 46s, a plurality of third pinion gears (short pinion gears) 45p meshing with the third sun gear 45s, a plurality of fourth pinion gears (long pinion gears) 46p meshing with the fourth sun gear 46s and the plurality of third pinion gears 45p and meshing with the third ring gear 45r, and a third carrier 45c holding the plurality of third pinion gears 45p and the plurality of fourth pinion gears 46p such that the plurality of third pinion gears 45p and the plurality of fourth pinion gears 46p can rotate (turn) and revolve.

The third planetary gear 45 is formed by the third sun gear 45s, the third carrier 45c, the third pinion gears 45p, the fourth pinion gears 46p, and the third ring gear 45r. The fourth planetary gear 46 is formed by the fourth sun gear 46s, the third carrier 45c, the fourth pinion gears 46p, and the third ring gear 45r. In the present embodiment, the planetary gear set 44 is configured such that the gear ratio λ3 of the third planetary gear 45 (the number of teeth of the third sun gear 45s/the number of teeth of the third ring gear 45r) is, e.g., λ3=0.488 and the gear ratio λ4 of the fourth planetary gear 46 (the number of teeth of the fourth sun gear 46s/the number of teeth of the third ring gear 45r) is, e.g., λ4=0.581.

Of the rotary elements of the planetary gear set 44, the fourth sun gear 46s functions as a fixable element of the planetary gear set 44. Moreover, the third carrier 45c is constantly coupled (fixed) to the input shaft 40 and is constantly coupled to the first carrier 42c of the first planetary gear 42 via the intermediate shaft 47. Accordingly, when the power is being transmitted from the engine etc. to the input shaft 40, the power from the engine etc. is constantly transmitted to the third carrier 45c via the input shaft 40. The third carrier 45c thus functions as an input element of the planetary gear set 44. The third ring gear 45r functions as a first output element of the planetary gear set 44, and the third sun gear 45s functions as a second output element of the planetary gear set 44.

The first clutch C1 connects and disconnects the first sun gear 42s of the first planetary gear 42 and the second sun gear 43s of the second planetary gear 43, which are constantly coupled together, to and from the third ring gear 45r of the planetary gear set 44. The second clutch C2 connects and disconnects the first sun gear 42s of the first planetary gear 42 and the second sun gear 43s of the second planetary gear 43, which are constantly coupled together, to and from the third sun gear 45s of the planetary gear set 44. The third clutch C3 connects and disconnects the second ring gear 43r of the second planetary gear 43 to and from the third ring gear 45r of the planetary gear set 44. The fourth clutch C4 connects and disconnects the first ring gear 42r of the first planetary gear 42 to and from the output shaft 41.

The first brake B1 holds (connects) the fourth sun gear 46s of the planetary gear set 44 stationary to the transmission case 5 so as not to allow the fourth sun gear 46s to rotate, and releases the fourth sun gear 46s held stationary from the transmission case 5 so as to allow the fourth sun gear 46s to rotate. The second brake B2 holds (connects) the second ring gear 43r of the second planetary gear 43 stationary to the transmission case 5 so as not to allow the second ring gear 43r to rotate, and releases the second ring gear 43r held stationary from the transmission case 5 so as to allow the second ring gear 43r to rotate.

In the present embodiment, multi-plate friction hydraulic clutches that have a hydraulic servo formed by a piston, a plurality of friction engagement plates (e.g., friction plates as annular members having a friction material boned to both surfaces thereof and separator plates as annular members having smooth surfaces on both sides), an engagement oil chamber and a centrifugal oil pressure cancel chamber to which hydraulic oil is supplied, etc. are used as the first to fourth clutches C1 to C4. Multi-plate friction hydraulic brakes that have a hydraulic servo formed by a piston, a plurality of friction engagement plates (friction plates and separator plates), an engagement oil chamber to which hydraulic oil is supplied, etc. are used as the first and second brakes B1, B2.

Figure 4:
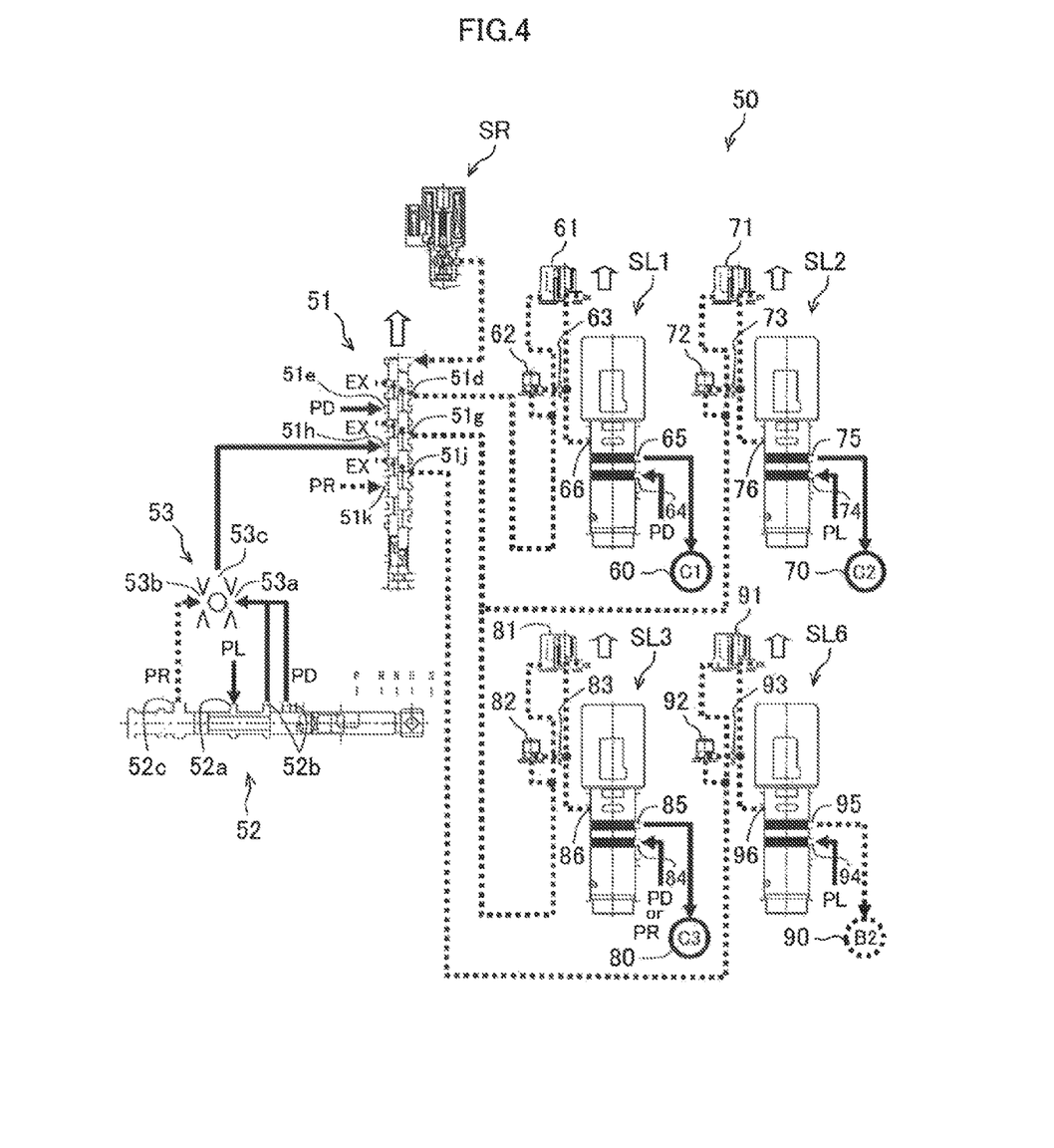
FIG. 4 is a schematic diagram showing how an oil pressure is supplied in the case where the forward speed is selected when the hydraulic control device according to the embodiment of the present disclosure is operating normally.

The automatic transmission 1 further includes a hydraulic servo 60 that can engage and disengage the first clutch C1, a hydraulic servo 70 that can engage and disengage the second clutch C2, a hydraulic servo 80 that can engage and disengage the third clutch C3, a hydraulic servo, not shown, that can engage and disengage the fourth clutch C4, a hydraulic servo, not shown, that can engage and disengage the first brake B1, and a hydraulic servo 90 that can engage and disengage the second brake B2 (see FIG. 4). The hydraulic servos for the first to fourth clutches C1 to C4 and the first and second brakes B1, B2 operate according to supply and discharge of hydraulic oil by the hydraulic control device 50.

Figure 2A:
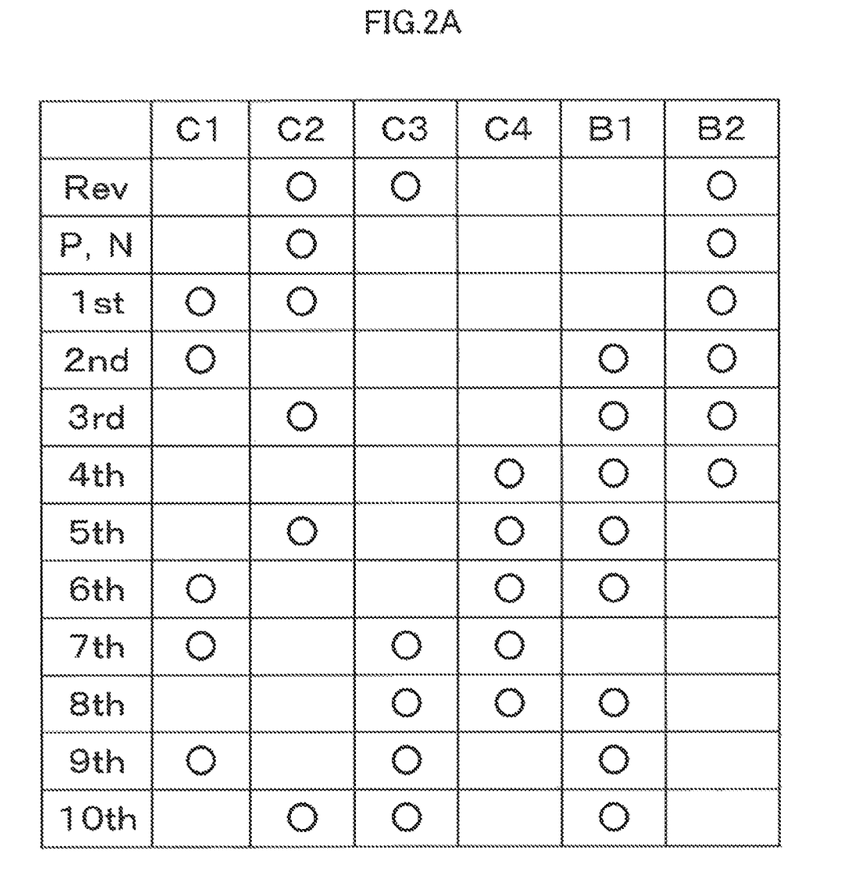
FIG. 2A is an engagement example in the case of establishing first to tenth forward speeds and a reverse speed.
Figure 2B:
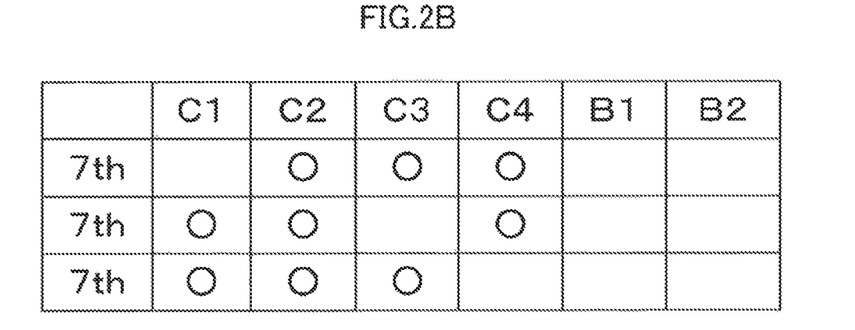
FIG. 2B is another engagement example in the case of establishing the seventh forward speed.

FIG. 2A is an engagement table showing the relationship between each shift speed of the speed change mechanism 4 and the operating state of the first to fourth clutches C1 to C4 and the first and second brakes B1, B2. FIG. 3 is a speed diagram showing the ratio of the rotational speed of each rotary element to the rotational speed of the input shaft 40 in the speed change mechanism 4 (the rotational speed of the input shaft 40, i.e., the first carrier 42c and the third carrier 45c, is the value of 1).

Figure 3:
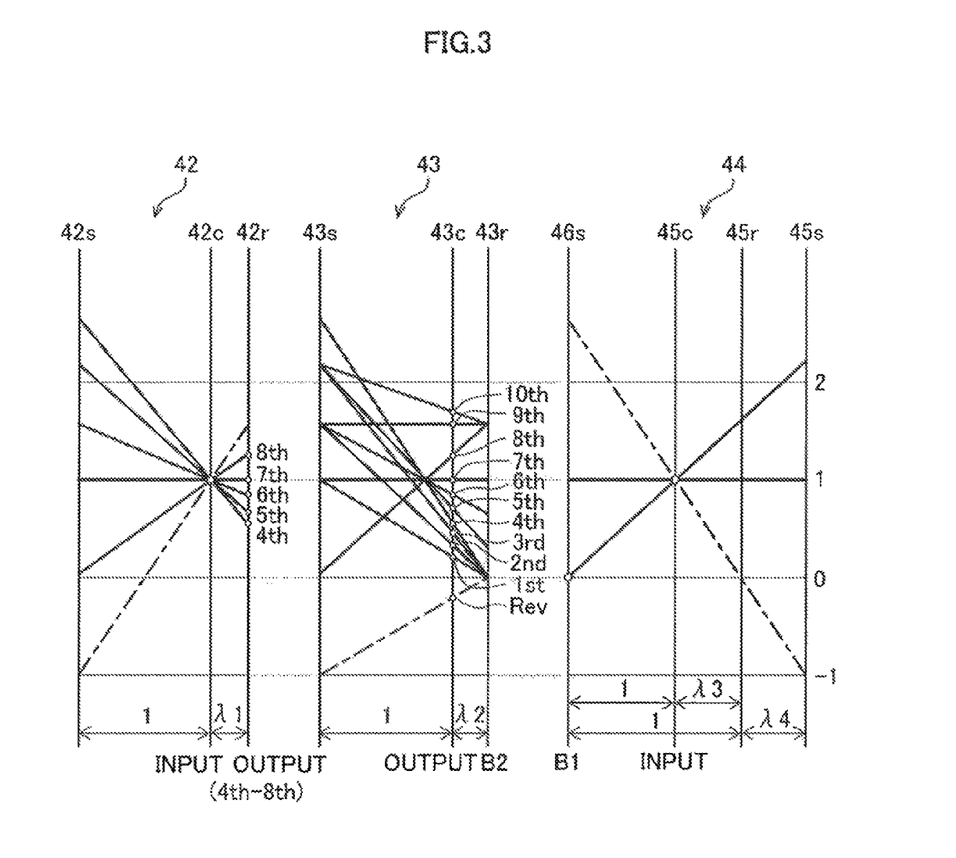
FIG. 3 is a speed diagram of the automatic transmission according to the embodiment of the present disclosure.

As shown in FIG. 3, the three rotary elements of the single-pinion type first planetary gear 42, namely the first sun gear 42s, the first ring gear 42r, and the first carrier 42c, are arranged in order of the first sun gear 42s, the first carrier 42c, and the first ring gear 42r from the left in the figure at intervals corresponding to the gear ratio λ1 on the speed diagram of the first planetary gear 42 (the speed diagram on the left side in FIG. 3). In the present embodiment, according to the order in which the rotary elements are arranged on the speed diagram, the first sun gear 42s is a first rotary element of the automatic transmission 1, the first carrier 42c is a second rotary element of the automatic transmission 1, and the first ring gear 42r is a third rotary element of the automatic transmission 1. Accordingly, the first planetary gear 42 has the first rotary element, the second rotary element, and the third rotary element of the automatic transmission 1 which are sequentially arranged at the intervals corresponding to the gear ratio λ1 on the speed diagram.

The three rotary elements of the single-pinion type second planetary gear 43, namely the second sun gear 43s, the second ring gear 43r, and the second carrier 43c, are arranged in order of the second sun gear 43s, the second carrier 43c, and the second ring gear 43r from the left in the figure at intervals corresponding to the gear ratio λ2 on the speed diagram of the second planetary gear 43 (the speed diagram in the middle in FIG. 3). In the present embodiment, according to the order in which the rotary elements are arranged on the speed diagram, the second sun gear 43s is a fourth rotary element of the automatic transmission 1, the second carrier 43c is a fifth rotary element of the automatic transmission 1, and the second ring gear 43r is a sixth rotary element of the automatic transmission 1. Accordingly, the second planetary gear 43 has the fourth rotary element, the fifth rotary element, and the sixth rotary element of the automatic transmission 1 which are sequentially arranged at the intervals corresponding to the gear ratio λ2 on the speed diagram.

Moreover, the four rotary elements of the planetary gear set 44, namely the fourth sun gear 46s, the third carrier 45c, the third ring gear 45r, and the third sun gear 45s, are arranged in this order from the left in the figure at intervals corresponding to the gear ratio λ3 of the single type third planetary gear 45 and the gear ratio λ4 of the double-pinion type fourth planetary gear 46 on the speed diagram of the planetary gear set 44 (the speed diagram on the right side in FIG. 3). In the present embodiment, according to the order in which the rotary elements are arranged on the speed diagram, the fourth sun gear 46s is a seventh rotary element of the automatic transmission 1, the third carrier 45c is an eighth rotary element of the automatic transmission 1, the third ring gear 45r is a ninth rotary element of the automatic transmission 1, and the third sun gear 45s is a tenth rotary element of the automatic transmission 1. Accordingly, the planetary gear set 44 has the seventh rotary element, the eighth rotary element, the ninth rotary element, and the tenth rotary element of the automatic transmission 1 which are sequentially arranged at the intervals corresponding to the gear ratios λ3, λ4 on the speed diagram.

In the automatic transmission 1 thus configured, the first to fourth clutches C1 to C4 and the first and second brakes B1, B2 shown in the skeleton diagram of FIG. 1 are engaged or disengaged according to the combinations shown in the engagement table of FIG. 2A to attain first to tenth forward speeds (1st to 10th) and a reverse speed (Rev) at the rotational speed ratios shown in the speed diagram of FIG. 3.

The seventh forward speed is established by engaging the first clutch C1, the third clutch C3, and the fourth clutch C4 and disengaging the remaining clutch, i.e., the second clutch C2, the first brake B1, and the second brake B2. That is, at the seventh forward speed, neither the first brake B1 nor the second brake B2 need be engaged, and a direct coupling speed is therefore established. Accordingly, the seventh forward speed is established by engaging three of the four clutches as shown in FIG. 2B. In the present embodiment, the gear ratio γ7 at the seventh forward speed is γ7=1.000.

Next, the hydraulic control device 50 for the automatic transmission 1 according to the present disclosure will be described. In the present embodiment, each valve has actually one spool. In order to explain the position to which the spool is switched or controlled, the state of the right-hand half portion shown in FIGS. 4 to 8 is referred to as a "right-half position", and the state of the left-hand half portion shown in FIGS. 4 to 8 is referred to as the "left-half position".

The hydraulic control device 50 includes an oil pump, not shown, a primary regulator valve that regulates an oil pressure from the oil pump to a line pressure PL, etc., and regulates and produces various source pressures. As shown in FIG. 4, the hydraulic control device 50 further includes a manual valve 52 that is switched by a shift lever to generate a forward range pressure PD and a reverse range pressure PR from the line pressure PL. The manual valve 52 includes an input port 52a to which the line pressure PL is input, a forward range pressure output port 52b that outputs the line pressure PL as the forward range pressure PD when the shift lever is in a forward range, and a reverse range pressure output port 52c that outputs the line pressure PL as the reverse range pressure PR when the shift lever is in a reverse range.

The hydraulic control device 50 further includes a linear solenoid valve (first solenoid valve) SL1, a linear solenoid valve (solenoid valve) SL2, a linear solenoid valve (solenoid valve) SL3, a linear solenoid valve (solenoid valve), not shown, that controls the fourth clutch C4, a linear solenoid valve (solenoid valve), not shown, that controls the first brake, a linear solenoid valve (solenoid valve) SL6, and a solenoid valve (second solenoid valve) SR. Each of the linear solenoid valves SL1 to SL6 can supply an oil pressure to the hydraulic servo of a corresponding one of the engagement elements.

Each of the linear solenoid valves SL1 to SL6 is of a normally closed (N/C) type that cuts off communication between an input port and an output port when no current is applied thereto (this state is hereinafter also referred to as "off") and that allows the input port to communicate with the output port when a current is applied thereto (this state is hereinafter also referred to as "on"). The solenoid valve SR is of a normally open (N/O) type.

Figure 8A:
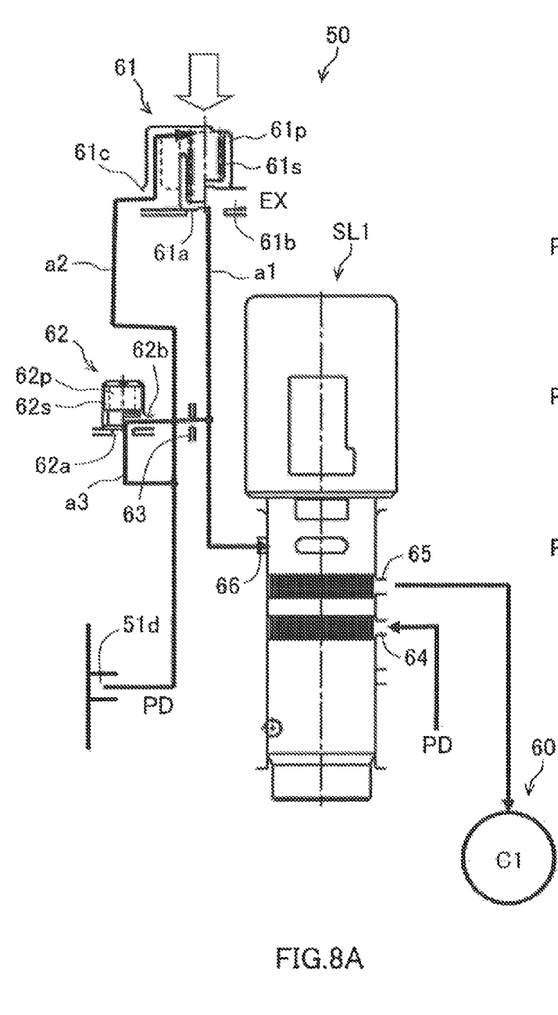
FIG. 8A shows a linear solenoid valve, a drain check valve, and a delay check valve.

As shown in FIG. 8A, the linear solenoid valve SL1 includes an input port 64, an output port 65, and a drain port 66, and is electrically controlled by an ECU, not shown. The forward range pressure PD can be input to the input port 64. The output port 65 communicates with the hydraulic servo 60 of the first clutch C1. The drain port 66 communicates with a drain check valve 61. When no control signal from the ECU is applied to the linear solenoid valve SL1, the linear solenoid valve SL1 is closed, and the forward range pressure PD input to the input port 64 is cut off. At this time, the drain port 66 communicates with the output port 65. When a control signal from the ECU is applied to the linear solenoid valve SL1, the linear solenoid valve SL1 is opened, and the forward range pressure PD input to the input port 64 is output from the output port 65 and is supplied to the hydraulic servo 60.

Since the operations of the linear solenoid valve SL2, the linear solenoid valve SL3, and the linear solenoid valve SL6 are similar to that of the linear solenoid valve SL1, description thereof is omitted. Only the oil pressure connection of the linear solenoid valves SL2, SL3, SL6 as shown in FIG. 4 will be described below.

The linear solenoid valve SL2 includes an input port 74 to which the line pressure PL can be input, an output port 75 that communicates with the hydraulic servo 70 of the second clutch C2, and a drain port 76 that communicates with a drain check valve 71. The linear solenoid valve SL3 includes an input port 84 to which the forward range pressure PD or the reverse range pressure PR can be input, an output port 85 that communicates with the hydraulic servo 80 of the third clutch C3, and a drain port 86 that communicates with a drain check valve 81. The linear solenoid valve SL6 includes an input port 94 to which the line pressure PL can be input, an output port 95 that communicates with the hydraulic servo 90 of the second brake B2, and a drain port 96 that communicates with a drain check valve 91.

The hydraulic control device 50 further includes a failsafe valve 51 that can carry out a limp home function by using the forward range pressure PD or the reverse range pressure PR, and a three-way valve (selection mechanism) 53. In the present embodiment, the shift speed that is established in a limp home mode is the seventh forward speed when the shift lever is in the forward range, and is the reverse speed when the shift lever is in the reverse range. When the manual valve 52 is switched according to operation of the shift lever, the vehicle can travel with the shift speed switched between the seventh forward speed and the reverse speed. That is, in the limp home mode, the shift speed can be switched between the seventh forward speed that is established by engaging the first clutch C1, the second clutch C2, and the third clutch C3 at the same time and the reverse speed that is established by engaging the second clutch C2, the third clutch C3, and the second brake B2 at the same time. Namely, two common engagement elements, i.e., the second clutch C2 and the third clutch C3, are engaged at both the seventh forward speed gear and the reverse speed.

The three-way valve (what is called "shuttle valve") 53 includes a first input port 53$a$ to which the forward range pressure PD can be input, a second input port 53$b$ to which the reverse range pressure PR can be input, and an output port 53$c$. The three-way valve 53 has, e.g., a ball inside so as to output the higher one of the oil pressures input to the first input port 53$a$ and the second input port 53$b$ from the output port 53$c$. In the present embodiment, since the forward range pressure PD and the reverse range pressure PR are not output simultaneously, one of the forward range pressure PD and the reverse range pressure PR which has been output is output from the output port 53$c$.

Figure 8B:
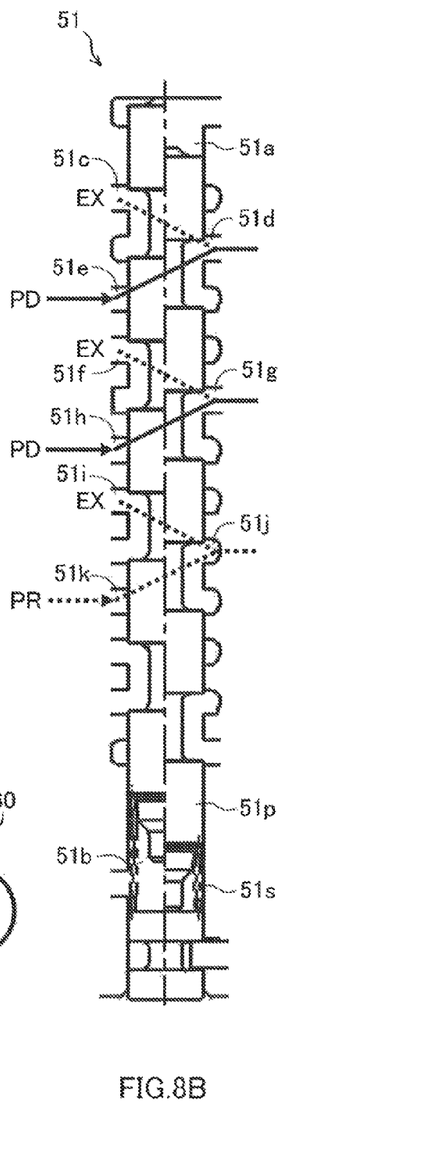
FIG. 8B shows a failsafe valve.

As shown in FIG. 8B, the failsafe valve 51 includes a spool 51$p$ and a spring 51$s$ that biases the spool 51$p$ upward in the figure. The failsafe valve 51 further includes a first oil chamber 51$a$ located above the spool 51$p$, a second oil chamber 51$b$ located below the spool 51$p$, a first drain port 51$c$, a forward output port (failure pressure output port) 51$d$, a forward range pressure input port 51$e$, a second drain port 51$f$, a common output port (failure pressure output port) 51$g$, a source pressure input port 51$h$, a third drain port 51$i$, a reverse output port (failure pressure output port) 51$j$, and a reverse range pressure input port 51$k$.

As shown in FIGS. 4 and 8B, the forward range pressure PD can be input to the forward range pressure input port 51$e$, and the forward output port 51$d$ communicates with the drain port 66 of the linear solenoid valve SL1. The forward range pressure PD or the reverse range pressure PR can be input to the source pressure input port 51$h$, and the source pressure input port 51$h$ communicates with the output port 53$e$ of the three-way valve 53. The common output port 51$g$ communicates with the drain port 76 of the linear solenoid valve SL2 and the drain port 86 of the linear solenoid valve SL3. The reverse range pressure PR can be input to the reverse range pressure input port 51$k$, and the reverse output port 51$j$ communicates with the drain port 96 of the linear solenoid valve SL6.

That is, the common output port 51$g$ communicates with the drain ports 76, 86 of the solenoid valves SL2, SL3 that can supply an oil pressure to the hydraulic servos 70, 80 of the second and third clutches C2, C3, namely a part of the engagement elements, or the common engagement elements that are engaged at both the seventh forward speed and the reverse speed. The forward output port 51$d$ communicates with the drain port 66 of the solenoid valve SL1 that can supply an oil pressure to the hydraulic servo 60 of the first clutch C1, namely the engagement element other than the second and third clutches C2, C3, or the engagement element other than the part of the engagement elements, out of the first, second, and third clutches C1, C2, C3 as the three engagement elements that are engaged to establish the seventh forward speed. Moreover, the reverse output port 51$j$ communicates with the drain port 96 of the solenoid valve SL6 that can supply an oil pressure to the hydraulic servo 90 of the second brake B2, namely the engagement element other than the second and third clutches C2, C3, or the engagement element other than the part of the engagement elements, out of the second and third clutches C2, C3 and the second brake B2 as the three engagement elements that are engaged to establish the reverse speed.

The biasing force of the spring 51$s$ is applied to the spool 51$p$ against a signal pressure from the solenoid valve SR, so that the spool 51$p$ is controlled to a normal position (left-half position) as the upper position in the figure and a failure position (right-half position) as the lower position in the figure. When the spool 51p is located at the normal position, the forward output port 51d and the first drain port 51c communicate with each other and are opened, the common output port 51g and the second drain port 51f communicate with each other and are opened, and the reverse output port 51j and the third drain port 51i communicate with each other and are opened. At the same time, when the spool 51p is located at the normal position, the supply of the oil pressure to the forward range pressure input port 51e, the source pressure input port 51h, and the reverse range pressure input port 51k is cut off. When the spool 51p is located at the failure position, the forward output port 51d and the forward range pressure input port 51e communicate with each other, so that the forward range pressure PD can be output from the forward output port 51d. The common output port 51g and the source pressure input port 51h communicate with each other, so that the forward range pressure PD or the reverse range pressure PR can be output from the common output port 51g. The reverse output port 51j and the reverse range pressure input port 51k communicate with each other, so that the reverse range pressure PR can be output from the reverse output port 51j. That is, the forward range pressure PD or the reverse range pressure PR output from each of the forward output port 51d, the common output port 51g, and the reverse output port 51j which correspond to the failure pressure output port of the present disclosure is reversely input to one of the linear solenoid valves SL1, SL2, SL3, SL6 as an oil pressure corresponding to the predetermined oil pressure of the present disclosure.

As shown in FIGS. 4 and 8A, the hydraulic control device 50 further includes the drain check valve (first check valve) 61, a delay check valve (second check valve) 62, and an orifice (delayer) 63.

The drain check valve 61 includes a first input port 61a that communicates with the drain port 66 of the linear solenoid valve SL1, a first drain port 61b, a sealing member (first movable member) 61p that can switchably allow the first input port 61a to communicate with the first drain port 61b and cut off the communication between the first input port 61a and the first drain port 61b, a back-side port 61c that communicates with the back side of the sealing member 61p, and a spring (first biaser) 61s that biases the sealing member 61p such that the communication between the first input port 61a and the first drain port 61b is cut off.

The delay check valve 62 includes a second input port 62a that communicates with the forward output port 51d, an output port 62b that communicates with the drain port 66 of the linear solenoid valve SL1, a sealing member (second movable member) 62p that can switchably allow the second input port 62a to communicate with the output port 62b and cut off the communication between the second input port 62a and the output port 62b, and a spring (second biaser) 62s. The spring 62s biases the sealing member 62p such that the communication between the second input port 62a and the output port 62b is cut off, and is set so as to allow the second input port to communicate with the output port at an oil pressure lower than the forward range pressure PD as the predetermined oil pressure. Accordingly, when the forward range pressure PD is applied to the second input port 62a, the sealing member 62p switches against the spring 62s to allow the second input port 62a to communicate with the output port 62b.

The linear solenoid valve SL1, the drain check valve 61, the delay check valve 62, and the failsafe valve 51 are coupled together by a first oil passage a1, a second oil passage a2, and a third oil passage a3. The first oil passage a1 connects the drain port 66 of the linear solenoid valve SL1 and the first input port 61a. The second oil passage a2 connects the forward output port 51d and the back-side port 61c and supplies the forward range pressure PD from the forward output port 51d to the drain check valve 61. That is, since the forward output port 51d of the failsafe valve 51 is connected to the back-side port 61c, the failsafe valve 51 can output from the forward output port 51d the forward range pressure PD, or the predetermined oil pressure, which biases the sealing member 61p such that the communication between the first input port 61a and the first drain port 61b is cut off.

The third oil passage a3 branches off from the second oil passage a2 and connects to the first oil passage a1 via the delay check valve 62. The orifice 63 is formed in the third oil passage a3 so as to delay an increase in oil pressure in the first oil passage a1 when an oil pressure is supplied to the first oil passage a1 via the third oil passage a3.

The drain check valve 61, the delay check valve 62, and the orifice 63 which are connected to the linear solenoid valve SL1 are described above. However, the present embodiment includes the drain check valve 71, a delay check valve 72, and an orifice 73 which are connected to the linear solenoid valve SL2, the drain check valve 81, a delay check valve 82, and an orifice 83 which are connected to the linear solenoid valve SL3, and the drain check valve 91, a delay check valve 92, and an orifice 93 which are connected to the linear solenoid valve SL6. Since the configurations of the drain check valves 71, 81, 91, the delay check valves 72, 82, 92, and the orifices 73, 83, 93 are similar to those of the drain check valve 61, the delay check valve 62, and the orifice 63, detailed description thereof will be omitted. For the linear solenoid valves SL2, SL3, the failure pressure output port is the common output port 51g, and the predetermined oil pressure is the forward range pressure PD or the reverse range pressure PR. For the linear solenoid valve SL6, the failure pressure output port is the reverse output port 51j, and the predetermined oil pressure is the reverse range pressure PR.

Operation of the failsafe valve 51 of the hydraulic control device 50 of the automatic transmission 1 according to the present embodiment will be described in detail below based on FIGS. 4 to 8.

When all of the linear solenoid valves SL1 to SL6 are operating normally, the failsafe valve 51 is located at the normal position. As shown in FIG. 4, when the manual valve 52 is in the forward range, the forward range pressure PD is supplied to the failsafe valve 51. However, since the supply of the oil pressure to both the forward range pressure input port 51e and the source pressure input port 51h is cut off, the operation that is caused by the failsafe valve 51 does not occur. Three of the linear solenoid valves SL1 to SL6, for example, the linear solenoid valves SL1, SL2, SL3, operate to engage the first clutch C1, the second clutch C2, and the third clutch C3 at the same time, whereby the seventh forward speed is established.

Figure 5:
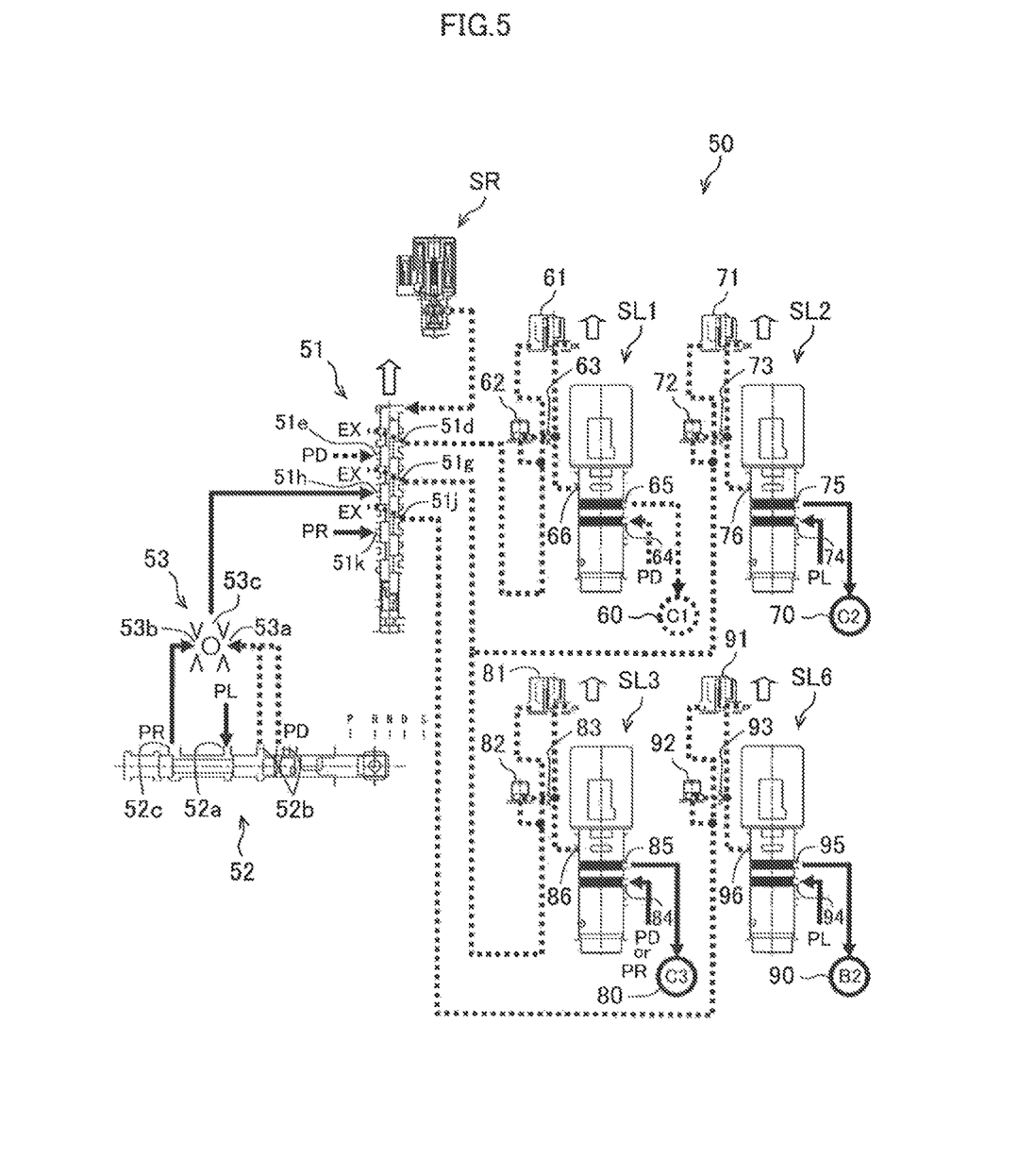
FIG. 5 is a schematic diagram showing how an oil pressure is supplied in the case where the reverse speed is selected when the hydraulic control device according to the embodiment of the present disclosure is operating normally.

In the case where the manual valve 52 is in the reverse range as shown in FIG. 5 when all of the linear solenoid valves SL1 to SL6 are operating normally, the reverse range pressure PR is supplied to the failsafe valve 51. However, since the supply of the oil pressure to both the reverse range pressure input port 51k and the source pressure input port 51h is cut off, the operation that is caused by the failsafe valve 51 does not occur. Three of the linear solenoid valves SL1 to SL6, for example, the linear solenoid valves SL2, SL3, SL6, operate to engage the second clutch C2, the third clutch C3, and the second brake B2 at the same time, whereby the reverse speed is established.

In case of all-off failure of the solenoid valves, no current is applied to any of the solenoid valves such as the linear solenoid valves SL1 to SL6 and the solenoid valve SR. Since the linear solenoid valves SL1 to SL6 are of a normally close type, the engagement elements corresponding to the linear solenoid valves SL1 to SL6 are not engaged even if a control signal is transmitted from the ECU to each of the linear solenoid valves SL1 to SL6. On the other hand, since the solenoid valve SR is of a normally open type, an oil pressure is supplied from the solenoid valve SR to the first oil chamber 51a of the failsafe valve 51 in case of all-off failure. The spool 51p is therefore pressed downward against the spring 51s, and the failsafe valve 51 is switched from the normal position to the failure position.

Figure 6:
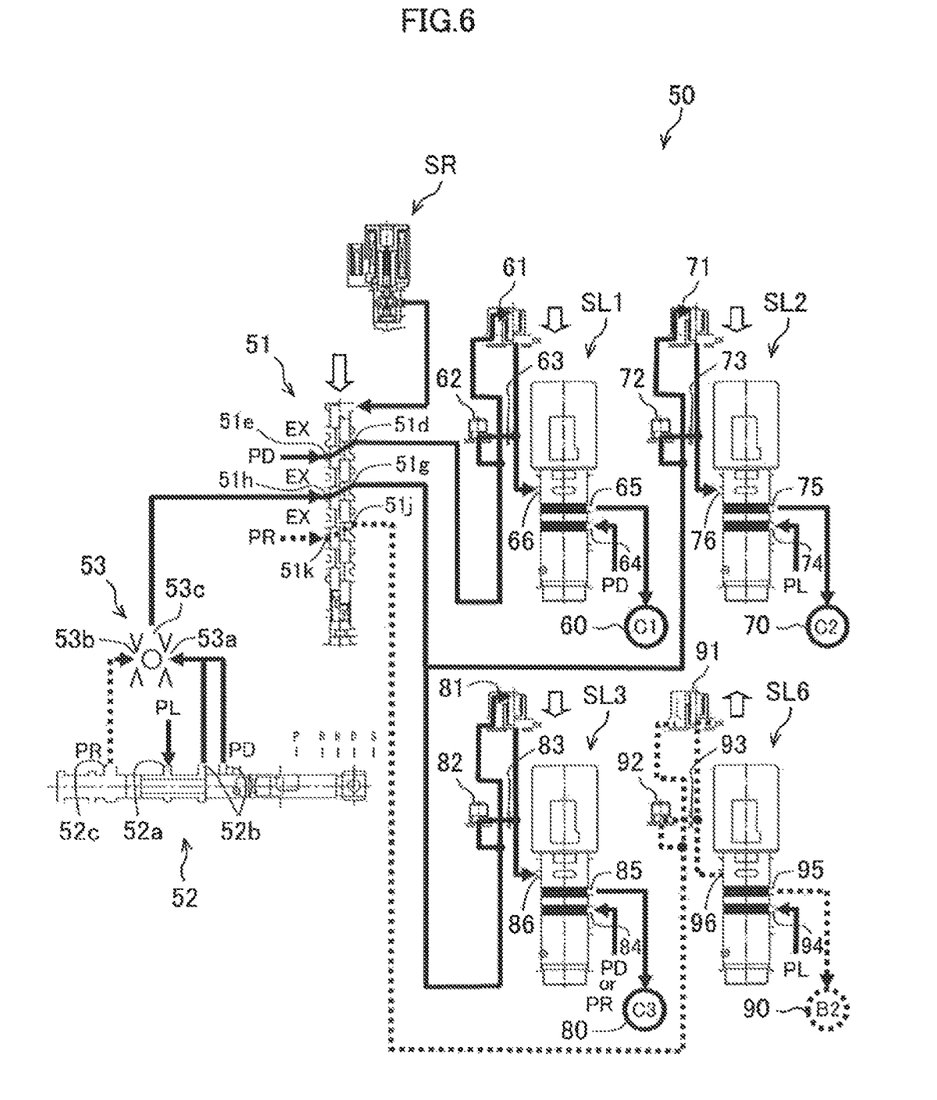
FIG. 6 is a schematic diagram showing how an oil pressure is supplied in the case where the forward speed is selected when the hydraulic control device according to the embodiment of the present disclosure is in a limp home mode.

As shown in FIG. 6, when the manual valve 52 is, e.g., in the forward range, the forward range pressure PD is produced and is input to the forward range pressure input port 51e and output from the forward output port 51d.

As shown in FIG. 8A, the forward range pressure PD thus output from the forward output port 51d is supplied to the back pressure port 61c of the drain check valve 61 through the second oil passage a2. The drain check valve 61 is thus locked with the communication between the first port 61c and the first drain port 61b being cut off. At this time, the forward range pressure PD in the second oil passage a2 is also diverted to the third oil passage a3 and is input to the second input port 62a of the delay check valve 62. The forward range pressure PD presses the sealing member 62p against the biasing force of the spring 62s, so that the second input port 62a communicates with the output port 62b and the oil pressure is output from the output port 62b. The forward range pressure PD is thus delayed and reduced when passing through the delay check valve 62 as this forward range pressure PD switches the sealing member 62p to the open side.

When the oil pressure thus reduced by the delay check valve 62 is supplied to the first oil passage a1 through the third oil passage a3, this oil pressure passes through the orifice 63 formed in the third oil passage a3. This delays an increase in oil pressure which is caused after the oil pressure is directed into the first oil passage a1.

Due to the delay in both increase in, and supply of, the oil pressure of the hydraulic oil flowing through the third oil passage a3, the hydraulic oil flowing in the third oil passage a3 reaches the drain check valve 61 through the first oil passage at after the forward range pressure PD locks the drain check valve 61 to the cut-off side. Moreover, due to the reduction in oil pressure of the hydraulic oil flowing in the third oil passage a3, the oil pressure having reached the drain check valve 61 through the first oil passage a1 is lower than the resultant force of the lock pressure and the lock force of the spring 61s. Accordingly, the oil pressure from the first oil passage a1 cannot open the drain check valve 61, and the hydraulic oil flows into the drain port 66 of the linear solenoid valve SL1 and is output from the output port 65 that communicates with the drain port 66 in case of off-failure. The hydraulic servo 60 is thus actuated.

As shown in FIG. 6, in the three-way valve 53, the forward range pressure PD is output from the output port 53c, and is input to the source pressure input port 51h and output from the common output port 51g. The forward range pressure PD thus output from the common output port 51g is supplied to the drain port 76 of the linear solenoid valve SL2 and the drain port 86 of the linear solenoid valve SL3 to actuate the hydraulic servos 70, 80. The drain check valve 71, the delay check valve 72, and the orifice 73 are interposed between the common output port 51g and the drain port 76 of the linear solenoid valve SL2, and the drain check valve 81, the delay check valve 82, and the orifice 83 are interposed between the common output port 51g and the drain port 86 of the linear solenoid valve SL3. Since the configurations and operations of the drain check valves 71, 81, the delay check valves 72, 82, and the orifices 73, 83 are similar to those of the drain check valve 61, the delay check valve 62, and the orifice 63 described above, description thereof will be omitted.

As described above, in case of all-off failure of the linear solenoid valves SL1 to SL6, the failsafe valve 51 is switched to the failure position by the limp home function. When the manual valve 52 is in the forward range, the hydraulic servos 60, 70, 80 are actuated, so that the first clutch C1, the second clutch C2, and the third clutch C3 are engaged at the same time to establish the seventh forward speed.

Figure 7:
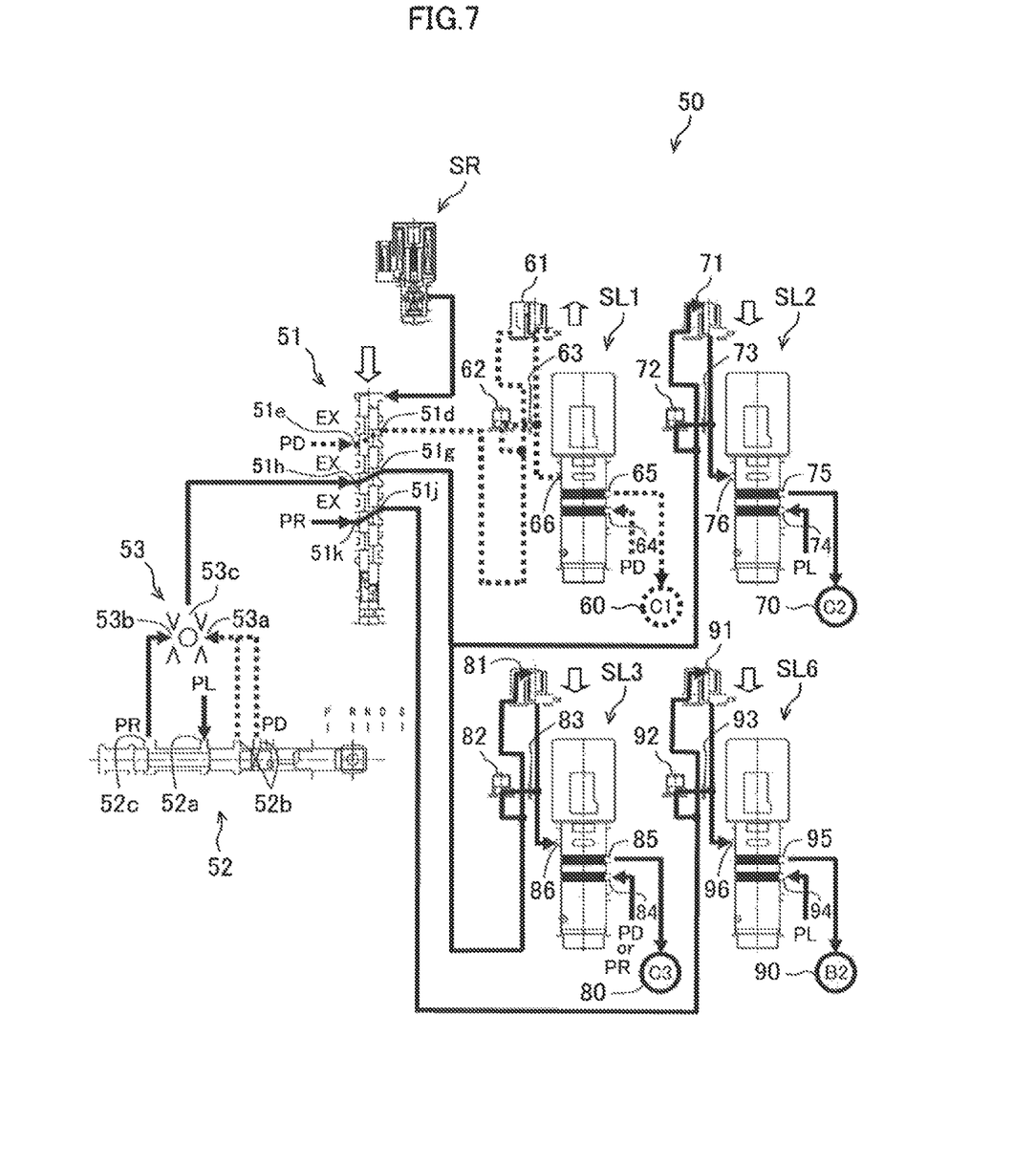
FIG. 7 is a schematic diagram showing how an oil pressure is supplied in the case where the reverse speed is selected when the hydraulic control device according to the embodiment of the present disclosure is in the limp home mode.

As shown in FIG. 7, when the manual valve 52 is, e.g., in the reverse range, the reverse range pressure PR is produced and is input to the reverse range pressure input port 51k and output from the reverse output port 51j. The reverse range pressure PR thus output from the reverse output port 51j is supplied to the drain port 96 of the linear solenoid valve SL6 to actuate the hydraulic servo 90. The drain check valve 91, the delay check valve 92, and the orifice 93 are interposed between the reverse output port 51j and the drain port 96 of linear solenoid valve SL6. Since the configurations and operations of the drain check valve 91, the delay check valve 92, and the orifice 93 are similar to those of the drain check valve 61, the delay check valve 62, and the orifice 63 described above, description thereof will be omitted.

In the three-way valve 53, the reverse range pressure PR is output from the output port 53c, and is input to the source pressure input port 51h and output from the common output port 51g. The reverse range pressure PR thus output from the common output port 51g is supplied to the drain port 76 of the linear solenoid valve SL2 and the drain port 86 of the linear solenoid valve SL3 to actuate the hydraulic servos 70, 80.

As described above, in case of all-off failure of the linear solenoid valves SL1 to SL6, the failsafe valve 51 is switched to the failure position by the limp home function. When the manual valves 52 is in the reverse range, the hydraulic servos 70, 80, 90 are actuated, so that the second clutch C2, the third clutch C3, and the second brake B2 are engaged at the same time to establish the reverse speed.

As described above, according to the hydraulic control device 50 of the present embodiment, the linear solenoid valves SL1, SL2, SL3, SL6 communicate directly with the drain check valves 61, 71, 81, 91, respectively. Accordingly, the first oil passage a1 that allows the linear solenoid valves SL1, SL2, SL3, SL6 to communicate with the drain check valves 61, 71, 81, 91 can be made shorter than in the case where the drain check valves communicate with the liner solenoid valves via the failsafe valve 51. This can restrain reduction in controllability due to an increase in flow resistance and can restrain an increase in size of the hydraulic control device.

In particular, in the hydraulic control device 50 of the present embodiment, in case of failure in which no current is applied to the linear solenoid valve SL1, the forward range pressure PD output from the forward output port 51d of the failsafe valve 51 biases the sealing member 61p of the drain check valve 61 such that the communication between the first input port 61a and the first drain port 61b is cut off.

The oil pressure having passed through the delay check valve 62 thus reaches the side of the drain check valve 61 on which the first input port 61a is opened. However, due to the delay in both supply of, and increase in, the oil pressure which is caused when the delay check valve 62 is switched to the open side, the first input port 61a and the first drain port 61b have already been locked in the cut-off state when the oil pressure reaches the drain check valve 61. Moreover, due to the reduction in oil pressure which is caused when opening the delay check valve 62, the oil pressure having reached the first input port 61a through the delay check valve 62 is lower than the lock pressure, or the forward range pressure PD, and the lock force of the spring 61s. Accordingly, the oil pressure output from the delay check valve 62 is reversely input to the drain port 66 of the linear solenoid valve SL1 without opening the drain check valve 61, so that the oil pressure can be supplied to the hydraulic servo 60 to control the hydraulic servo 60. Since functions and effects of the other drain check valves 71, 81, 91 are similar to those of the drain check valve 61, detailed description thereof will be omitted.

The hydraulic control device 50 of the present embodiment includes the first oil passage a1 that connects the drain port 66 of the linear solenoid valve SL1 and the first input port 61a, the second oil passage a2 through which the forward range pressure PD is supplied from the forward output port 51d to the drain check valve 61, and the third oil passage a3 that branches off from the second oil passage a2 and that connects to the first oil passage a1 via the delay check valve 62. The third oil passage a3 has the orifice 63 that delays an increase in oil pressure in the first oil passage a1 when an oil pressure is supplied to the first oil passage a1 through the third oil passage a3.

This can further delay the oil pressure that is supplied from the delay check valve 62 to the drain check valve 61 when the failsafe valve 51 is switched to the failure position. This more reliably allows the oil pressure from the delay check valve 62 to reach the drain check valve 61 after the first input port 61a and the first drain port 61b are locked in the cut-off state, whereby more stable operation can be implemented.

In the hydraulic control device 50 of the present embodiment, the delayer is the orifice 63 formed in the third oil passage a3. This can simplify the configuration and can minimize an increase in component cost.

The hydraulic control device 50 of the present embodiment includes the normally open solenoid valve SR that supplies an oil pressure to the failsafe valve 51 to switch the failsafe valve 51 to the failure position in case of failure. Accordingly, in case of all-off failure, an oil pressure is supplied from the solenoid valve SR to the first oil chamber 51a of the failsafe valve 51. The spool 51p is therefore pressed downward against the spring 51s, and the failsafe valve 51 is switched from the normal position to the failure position.

In the hydraulic control device 50 of the present embodiment, the first clutch C1, the second clutch C2, and the third clutch C3 are selected as three engagement elements that are engaged to establish the seventh forward speed. However, the present disclosure is not limited to this. For example, the second clutch C2, the third clutch C3, and the fourth clutch C4 may be selected. In this case, the linear solenoid valve SL4 is used instead of the linear solenoid valve SL1 shown in FIGS. 4 to 7. The shift speed that is established in the limp home mode in the forward range is not limited to the above embodiment, and other shift speeds may be established.

The hydraulic control device 50 of the present embodiment is described with respect to the case where the orifice 63 is used as the delayer. However, the present disclosure is not limited to this, and any member or mechanism that delays an increase in, and supply of, an oil pressure may be used as appropriate.

The hydraulic control device 50 of the present embodiment is described with respect to the case where the springs 61s, 62s are used as the biaser of the drain check valve 61 and the delay check valve 62. However, the present disclosure is not limited to this, and any other common member or mechanism may be used as appropriate.

The hydraulic control device 50 of the present embodiment is described with respect to the case where the forward range pressure PD or the reverse range pressure PR is supplied as a lock pressure to the sealing member 61p of the drain check valve 61 in case of all-off failure. However, the present disclosure is not limited to this. For example, in case of all-off failure, an oil pressure other than the forward range pressure PD and the reverse range pressure PR, such as, e.g., an oil pressure from a separate solenoid valve, may be supplied as a lock pressure to the sealing member 61p of the drain check valve 61, or a mechanical external force of a member, a mechanism, etc. other than an oil pressure may be applied to bias the sealing member 61p of the drain check valve 61. This can improve design flexibility.

The hydraulic control device 50 of the present embodiment is described with respect to the case where an oil pressure is supplied to the hydraulic servos of the linear solenoid valves SL1 to SL6. However, the present disclosure is not limited to this, and solenoid valves other than liner solenoid valves may be used.

Among hydraulic control devices that implement multi-speed shifting by controlling the engagement states of a plurality of engagement elements in a stepped automatic transmission, those hydraulic control devices are conventionally widely used which include linear solenoid valves that can supply an oil pressure to hydraulic servos for engaging and disengaging the engagement elements, and which have a limp home function for all-off failure, or failure in which all of solenoid valves such as the plurality of linear solenoid valves are turned off (a function to establish a shift speed even in case of all-off failure such that the vehicle can be driven). Hydraulic control devices for automatic transmissions are under development which, as such a limp home function, can switch between a forward shift speed and a reverse shift speed according to switching between forward traveling and reverse traveling of the vehicle in the limp home mode. Such hydraulic control devices include a switching valve that ensures a forward travel operation and a switching valve that ensures a reverse travel operation in case of all-off failure of the solenoid valves.

However, since such a hydraulic control device includes the forward switching valve and the reverse switching valve in order to establish a shift speed in the limp home mode. This may increase the size of the hydraulic control device, and it is preferable to implement a more compact hydraulic control device. That is, a hydraulic control device is desired which has a limp home function capable of switchably implementing forward traveling and reverse traveling in case of all-off failure of solenoid valves, and which can have a more compact configuration.

The hydraulic control device 50 of the present embodiment is the hydraulic control device 50 for the automatic transmission 1 that can establish a plurality of shift speeds by selectively engaging three engagement elements out of the first to fourth clutches C1 to C4 and the first and second brakes B1, B2, and in which a part of the engagement elements, namely the second and third clutches C2, C3, are the common engagement elements that are included in both the first to third clutches C1 to C3 that are engaged to establish a predetermined forward speed (seventh forward speed) and the second and third clutches C2, C3 and the second brake B2 that are engaged to establish the reverse speed. The hydraulic control device 50 for the automatic transmission 1 includes: the plurality of linear solenoid valves SL1, SL2, SL3, SL6 that can supply an oil pressure to the hydraulic servos 60, 70, 80, 90 of the first to fourth clutches C1 to C4 and the first and second brakes B1, B2; and the failsafe valve 51. The failsafe valve 51 includes: the source pressure input port 51h to which the forward range pressure PD or the reverse range pressure PR is input as a source pressure; the forward range pressure input port 51e to which the forward range pressure PD is input; the reverse range pressure input port 51k to which the reverse range pressure PR is input; the common output port 51g that communicates with the drain ports 76, 86 of the linear solenoid valves SL2, SL3 that can supply an oil pressure to the hydraulic servos 70, 80 of the second and third clutches C2, C3 as the common engagement elements, or the part of the engagement elements; the forward output port 51d that communicates with the drain port 66 of the linear solenoid valve SL1 that can supply an oil pressure to the hydraulic servo 60 of the first clutch C1, namely the engagement element other than the second and third clutches C2, C3, or the engagement element other than the part of the engagement elements, out of the first to third clutches C1 to C3 that are engaged to establish forward speeds; and the reverse output port 51j that communicates with the drain port 96 of the linear solenoid valve SL6 that can supply an oil pressure to the hydraulic servo 90 of the second brake B2, namely the engagement element other than the second and third clutches C2, C3, or the engagement element other than the part of the engagement elements, out of the second and third clutches C2, C3 and the second brake B2 that are engaged to establish the reverse speed. The failsafe valve 51 can be switched between the normal position where all of the common output port 51g, the forward output port 51d, and the reverse output port 51j are allowed to drain an oil pressure and the failure position where the source pressure input port 51h communicates with the common output port 51g, the forward range pressure input port 51e communicates with the forward output port 51d, and the reverse range pressure input port 51k communicates with the reverse output port 51j.

The hydraulic control device 50 of the present embodiment can thus carry out the limp home function in case of all-off failure of the linear solenoid valves SL1 to SL6 by selecting either the seventh forward speed or the reverse speed by switching the failsafe valve 51 to the failure position. Since the failsafe valve 51 required for the limp home function can be implemented by only one switching valve, the number of components can be reduced and the size of the hydraulic control device 50 can be reduced as compared to the case where a plurality of switching valves are used.

If the input ports and the output ports of the failsafe valve 51 are provided separately for the forward and reverse ranges, the failsafe valve 51 has six input ports and six output ports. According to the present embodiment, the failsafe valve 51 has three input ports, namely the forward range pressure input port 51e, the source pressure input port 51h, and the reverse range pressure input port 51k, and three output ports, namely the forward output port 51d, the common output port 51g, and the reverse output port 51j. This can reduce the overall length of the failsafe valve 51, whereby reduction in size can be achieved.

The hydraulic control device 50 of the present embodiment further includes: the range pressure output mechanism 52 that outputs the forward range pressure PD when the shift speed is a forward speed and that outputs the reverse range pressure PR when the shift speed is the reverse speed, and the three-way valve (selection mechanism) 53 that applies one of the forward range pressure PD and the reverse range pressure PR, which has been output, to the source pressure input port 51h as a source pressure.

As described above, according to the hydraulic control device 50 of the present embodiment, the three-way valve 53 applies one of the forward range pressure PD and the reverse range pressure PR, which has been output, to the source pressure input port 51h as a source pressure. The source pressure can therefore be generated from the forward range pressure PD and the reverse range pressure PR by using a simple configuration, whereby an increase in component cost and an increase in size of the hydraulic control device can be restrained.

In the hydraulic control device 50 of the present embodiment, the range pressure output mechanism is the manual valve 52.

According to the hydraulic control device 50 of the present embodiment, the source pressure is one of the forward range pressure PD and the reverse range pressure PR which is output via the manual valve 52. No source pressure is therefore output when the neutral range is selected by the shift lever. Accordingly, even if the failsafe valve 51 is located in the failure position due to failure of a valve stick etc., and on-failure occurs in any of the solenoid valves other than the solenoid valves communicating with the common output port 51g and an oil pressure can therefore be supplied to a corresponding one of the hydraulic servos, namely, even if double failure occurs, no oil pressure is supplied to the solenoid valves communicating with the common output port 51g, if the neutral range is selected by the shift lever. The forward speeds and the reverse speed can therefore be prevented from being established when the neutral range is selected.

In the hydraulic control devices 50 of the present embodiment, the second and third clutches C2, C3, or the part of the engagement elements, are two engagement elements. Accordingly, the two linear solenoid valves SL2, SL3 communicate with the common output port 51g, and the single linear solenoid valve SL1 and the single linear solenoid valve SL6 communicate with the forward output port 51d and the reverse output port 51j, respectively. Accordingly, for example, if the driver switches the shift lever from the D range to the R range in case of all-off failure, oil pressure supply is switched for only one of the three engagement elements. The shift speed can therefore be quickly shifted to the forward speed or the reverse speed. Moreover, since the number of branches in the oil passage between the failsafe valve 51 and the linear solenoid valves SL2, SL3 can be reduced to one, flow rate loss of the oil pressure can be reduced and more compact design of the hydraulic circuit can be implemented as compared to the case where the number of common engagement elements, or the number of the part of engagement elements, is one and the number of branches in the oil passage is two for each of the remaining two engagement elements that are engaged at the forward speed or the reverse speed.

In the hydraulic control device 50 of the present embodiment, the six engagement elements are four clutches and two brakes, namely the first to fourth clutches C1 to C4 and the first and second brakes B1, B2. The first to third clutches C1 to C3 that are engaged to establish the forward speed are three clutches that form a direct coupling speed out of the four clutches, namely the first to fourth clutches C1 to C4. Since the direct coupling speed is established in the case of establishing the forward speed in the limp home mode, limp home traveling can be implemented with a satisfactory balance between the driving force and the rotational speed.

INDUSTRIAL APPLICABILITY

The hydraulic control device for the automatic transmission according to the present disclosure is applicable to vehicles such as a passenger car and a truck, and in particular, is preferably applied to vehicles having a limp home function for off-failure of solenoid valves that can supply an oil pressure to hydraulic servos of a plurality of engagement elements.

The invention claimed is:

1. A hydraulic control device for an automatic transmission that can establish a plurality of shift speeds by selectively engaging a plurality of engagement elements, the hydraulic control device comprising:
    a normally closed first solenoid valve that can supply an oil pressure to a hydraulic servo of an engagement element of the plurality of engagement elements;
    a first check valve having a first input port that communicates with a drain port of the first solenoid valve, a first drain port, a first movable member that can switchably allow the first input port to communicate with the first drain port and cut off the communication between the first input port and the first drain port, and a first biaser that biases the first movable member such that the communication between the first input port and the first drain port is cut off;
    a failsafe valve having a failure pressure output port that is switched to a failure position to output a predetermined oil pressure in case of failure in which no current is applied to the first solenoid valve; and
    a second check valve having a second input port that communicates with the failure pressure output port, an output port that communicates with the drain port of the first solenoid valve and the first input port of the first check valve, a second movable member that can switchably allow the second input port to communicate with the output port and cut off the communication between the second input port and the output port, and a second biaser that biases the second movable member such that the communication between the second input port and the output port is cut off and for allowing the second input port to communicate with the output port at an oil pressure lower than the predetermined oil pressure, wherein
    the first movable member of the first check valve is biased to cut off the communication between the first input port and the first drain port in case of the failure in which no current is applied to the first solenoid valve.

2. The hydraulic control device for an automatic transmission according to claim 1, wherein
    the first movable member of the first check valve is biased to cut off the communication between the first input port and the first drain port by the predetermined oil pressure output from the failure pressure output port of the failsafe valve in case of the failure in which no current is applied to the first solenoid valve.

3. The hydraulic control device for an automatic transmission according to claim 2, further comprising:
    a first oil passage that connects the drain port of the first solenoid valve and the first input port;
    a second oil passage through which the predetermined oil pressure is supplied from the failure pressure output port to the first check valve; and
    a third oil passage that branches off from the second oil passage and that connects to the first oil passage via the second check valve, wherein
    the third oil passage has a delayer that delays an increase in oil pressure in the first oil passage when the oil pressure is supplied to the first oil passage through the third oil passage.

4. The hydraulic control device for an automatic transmission according to claim 3, wherein
    the delayer is an orifice formed in the third oil passage.

5. The hydraulic control device for an automatic transmission according to claim 4, further comprising:
    a normally open second solenoid valve that supplies an oil pressure to the failsafe valve to switch the failsafe valve to the failure position in case of the failure.

6. The hydraulic control device for an automatic transmission according to claim 1, further comprising:
    a normally open second solenoid valve that supplies an oil pressure to the failsafe valve to switch the failsafe valve to the failure position in case of the failure.

7. The hydraulic control device for an automatic transmission according to claim 2, further comprising:
    a normally open second solenoid valve that supplies an oil pressure to the failsafe valve to switch the failsafe valve to the failure position in case of the failure.

8. The hydraulic control device for an automatic transmission according to claim 3, further comprising:
    a normally open second solenoid valve that supplies an oil pressure to the failsafe valve to switch the failsafe valve to the failure position in case of the failure.

* * * * *